US012776658B2

(12) United States Patent
Jones et al.

(10) Patent No.: US 12,776,658 B2

(45) Date of Patent: Oct. 27, 2026

(54) ENERGY DISTRIBUTION SYSTEM INCLUDING SOURCE PRIORITIZATION

(71) Applicant: GM Global Technology Operations LLC, Detroit, MI (US)

(72) Inventors: Brandon R. Jones, White Lake Township, MI (US); Brian Trimboli, Rochester Hills, MI (US); Ian Forsman-Kendall, Farmers Branch, TX (US); Mohammad Saad Alam, Wayne, MI (US); James C. Gibbs, Brighton, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 350 days.

(21) Appl. No.: 18/429,542

(22) Filed: Feb. 1, 2024

(65) Prior Publication Data

US 2025/0253694 A1 Aug. 7, 2025

(51) Int. Cl.

| | |
|---|---|
| ***B60L 53/52*** | (2019.01) |
| ***B60L 53/51*** | (2019.01) |
| ***B60L 53/60*** | (2019.01) |
| ***H02J 3/38*** | (2006.01) |
| ***H02J 7/00*** | (2006.01) |
| *B60K 6/28* | (2007.10) |
| *B60L 55/00* | (2019.01) |
| *G06F 18/213* | (2023.01) |
| *G06Q 50/06* | (2024.01) |

(52) U.S. Cl.

CPC .............. *H02J 7/865* (2026.01); *B60L 53/51* (2019.02); *B60L 53/52* (2019.02); *B60L 53/60* (2019.02); *H02J 3/38* (2013.01); *B60L 55/00* (2019.02)

(58) Field of Classification Search

CPC .... H02J 7/865; H02J 3/38; H02J 7/855; H02J 2105/37; H02J 2105/50; B60L 53/51; B60L 53/52; B60L 53/60; B60L 55/00; B60K 6/22; B60K 6/28; G06F 18/213; G06Q 50/06

USPC .......................................................... 700/287

See application file for complete search history.

(56) References Cited

U.S. PATENT DOCUMENTS

| | | | | |
|---|---|---|---|---|
| 11,532,943 | B1 * | 12/2022 | Zauli | H02J 3/004 |
| 2012/0245750 | A1 * | 9/2012 | Paul | G06Q 50/06 700/291 |
| 2014/0203775 | A1 * | 7/2014 | Kim | B60L 53/65 320/109 |
| 2022/0147035 | A1 | 5/2022 | Rodemann et al. | |
| 2024/0097444 | A1 * | 3/2024 | Ou | G06Q 40/04 |

FOREIGN PATENT DOCUMENTS

WO 2015062636 A1 5/2015

OTHER PUBLICATIONS

German Application No. 10 2024 108 802.8 filed Mar. 27, 2024; German Office Action dated Oct. 29, 2024; 6 pages.

* cited by examiner

*Primary Examiner* — Michael J Brown

(74) *Attorney, Agent, or Firm* — CANTOR COLBURN LLP

(57) ABSTRACT

An energy distribution system includes at least a first energy storage system including a controller and at least one energy storage unit configured to store a quantity of energy. The controller includes a memory storing an energy meta-data file. The energy meta data file includes an energy type element and an energy source element.

20 Claims, 4 Drawing Sheets

ENERGY DISTRIBUTION SYSTEM INCLUDING SOURCE PRIORITIZATION

INTRODUCTION

The subject disclosure relates to energy distribution and management systems, and in particular energy distribution systems configured to include prioritization of energy based on one or more criteria.

In order to provide desirable driving range, electric vehicles and some hybrid electric vehicles include high capacity battery systems which are capable of storing large amounts of energy. In some examples, the vehicles can be configured to return excess energy from the vehicle to an exterior energy source through an external device. Due to the mobile nature of an electric vehicle and the ability to charge electric vehicles from multiple different sources, electric vehicles frequently receive and distribute energy sourced using multiple different types of energy including green energy sources and non-renewable energy sources.

Accordingly, it is desirable to provide a system for prioritizing which types of energy are received and distributed through electric vehicle battery systems.

SUMMARY

In one exemplary embodiment an energy distribution system includes at least a first energy storage system including a controller and at least one energy storage unit configured to store a quantity of energy. The controller includes a memory storing an energy meta-data file. The energy meta data file includes an energy type element and an energy source element.

In addition to one or more of the features described herein the energy type element includes at least a first fossil fuel energy category, at least a first green fuel energy category, and an unknown type category.

In addition to one or more of the features described herein the at least the first green energy category includes a plurality of green energy categories.

In addition to one or more of the features described herein the quantity of energy is associated with the meta-data file in a fungible energy association.

In addition to one or more of the features described herein the quantity of energy is associated with the meta-data file in a per-unit energy association.

In addition to one or more of the features described herein the memory further stores instructions for causing the controller to implement a method for prioritizing energy distribution, the method includes identifying a first prioritization condition for a pending energy transfer, transferring energy units matching the prioritization condition in an energy transfer, and determining a response when the energy transfer is incomplete an energy units matching the prioritization condition are exhausted.

In addition to one or more of the features described herein determining the response comprises identifying a second prioritization condition and transferring energy units matching the second prioritization condition.

In addition to one or more of the features described herein determining the response comprises ending the energy transfer.

In addition to one or more of the features described herein the prioritization condition includes at least one of a type of energy and a source of energy.

In addition to one or more of the features described herein the type of energy includes at least one of green energy, wind energy, solar energy, and hydroelectric energy.

In addition to one or more of the features described herein the source of energy includes at least one of a power grid, an energy cost, and a charge location.

In addition to one or more of the features described herein the controller is configured to manage the energy meta-data file through a remote connection with one of a cloud service and a remote server.

In addition to one or more of the features described herein the at least the first energy storage system includes an electric vehicle energy storage system.

In another exemplary embodiment a method for prioritizing energy flow between energy storage systems includes identifying a primary prioritization condition for a pending energy transfer, identifying energy units matching the primary prioritization condition within an energy source by reading an energy meta data file corresponding to the energy source, transferring energy units matching the primary prioritization condition in an energy transfer from the energy source to an energy destination, and determining a response when the energy transfer is incomplete and energy units matching the primary prioritization condition are exhausted.

In addition to one or more of the features described herein determining the response when the energy transfer is incomplete and energy units matching the primary prioritization condition are exhausted comprises ceasing the energy transfer.

In addition to one or more of the features described herein determining the response when the energy transfer is incomplete and energy units matching the primary prioritization condition are exhausted comprises identifying at least one secondary prioritization condition and transferring energy units matching the at least one secondary prioritization condition.

In addition to one or more of the features described herein the energy meta data file includes an energy type element and an energy source element.

In addition to one or more of the features described herein the energy meta data file is a fungible tracking energy meta data file.

In addition to one or more of the features described herein the energy meta data file is a per unit meta data file.

In addition to one or more of the features described herein one of the energy source and the energy destination is a vehicle energy storage system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
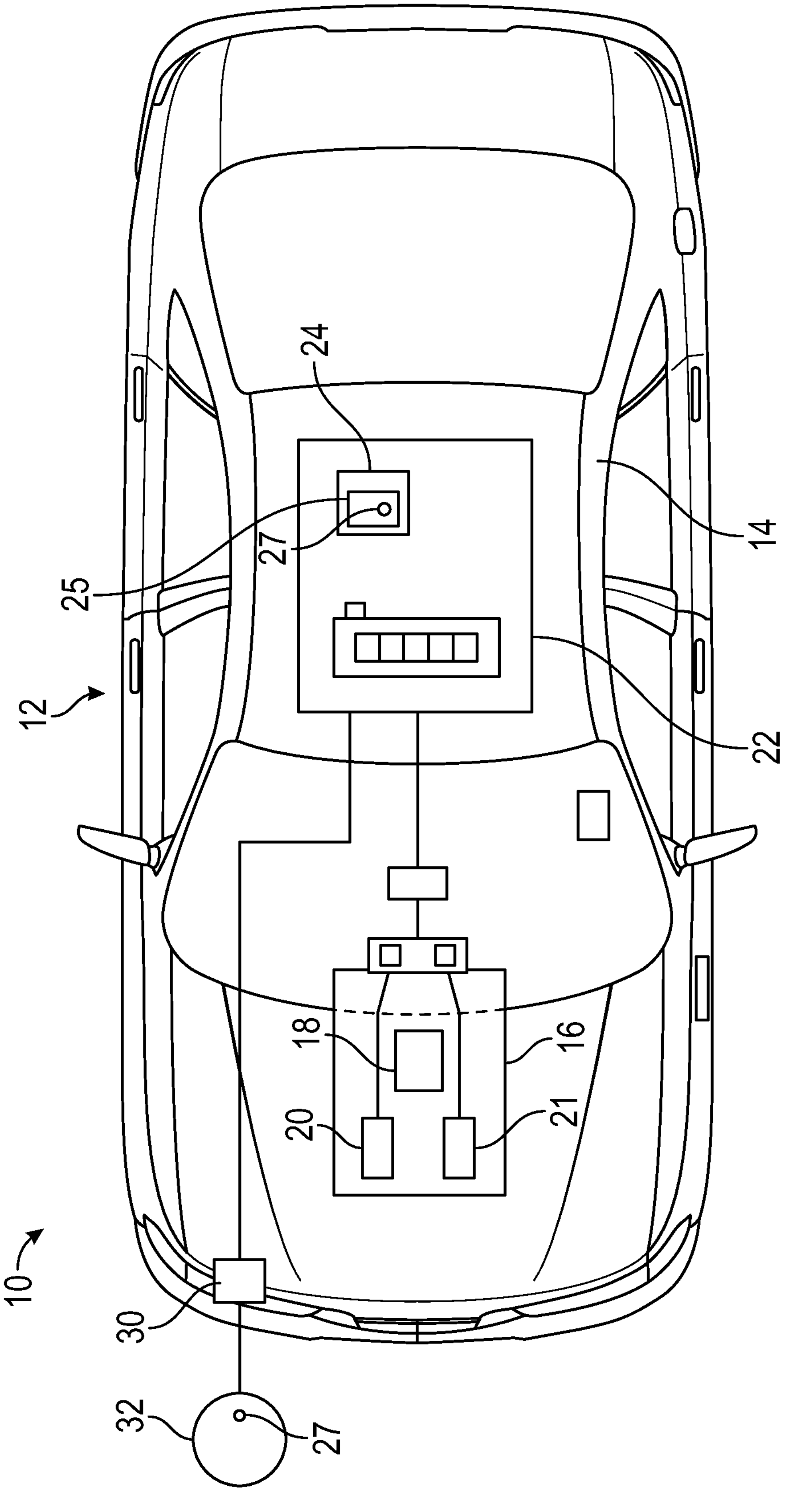
FIG. 1 is an exemplary vehicle.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As used herein the term controller refers to any computerized control system including dedicated control systems, general vehicle controllers, control programs distributed across multiple systems, or any similar control architecture.

In accordance with an exemplary embodiment, an energy storage system for an electric vehicle includes a battery controller. The battery controller includes a memory storing an energy meta data file. The energy meta data file tracks a source, quantity, and type of energy stored within the energy storage system. In one example, the energy meta data file tracks what portion of the stored energy is green (renewable) energy, what portion of the energy is fossil fuel-based (non-renewable) energy, and which portion of the energy has an unknown provenance.

In addition, the energy meta data file tracks sources of the energy (e.g., a power grid, a home storage unit, a commercial charging station, etc.). In yet further examples, the energy meta data file can track a cost of the energy received from any given source, a time of day in which the energy was received from the source of the energy, as well as any other available information about the energy. In examples where energy is being transferred between two systems (e.g., a home charger and an electric vehicle) where each system has an energy meta data file, the meta data file for the transferred energy can be provided to the receiving system allowing for efficient updating of the meta data information in each system, and continuous tracking of how units of energy flow through an energy distribution system.

The energy meta data file can utilize either fungible tracking or per-unit tracking. As used herein "fungible tracking" refers to a tracking method where energy is treated as a fungible item and in which the portions and origins of the energy are stored as a percentage of total charge. In one example, for a quantity of energy the fungible tracking method would identify the type as 80% green energy, 10% fossil fuel energy, and 10% unknown provenance energy. Any energy transferred from the electric vehicle would include meta data identifying the energy transferred as being 80% green energy, 10% fossil fuel energy, and 10% unknown provenance energy.

As used herein "per unit tracking" refers to a tracking method where energy is treated as discrete units, and the meta data file tracks quantities of energy corresponding to each category. By way of example, a per unit tracking method would identify a type, a source, and any other available information for each unit of energy received, with the energy meta data file storing the information of every unit received. Energy transferred from a per unit tracking method includes meta data identifying the source and type of each unit of energy that was transferred as well as any available supplemental information such as cost, entity paying for the energy, etc.

Also included in some exemplary embodiments are instructions, stored on a memory, and configured to cause a controller to implement a prioritization of energy transfer based on conditions related to the meta data file. By way of example, the conditions can prevent transfer of energy obtained from a complementary work charger, prioritize transfer of green energy, prioritize transfer of energy to certain systems, etc.

With continued reference to the general system described above, FIG. 1 shows an embodiment of a motor vehicle 10. The vehicle 10 includes a vehicle body 12 defining, at least in part, an occupant compartment 14. The vehicle body 12 also supports various vehicle subsystems including a propulsion system 16, an energy storage unit (battery system 22), and other subsystems to support functions of the propulsion system 16 and other vehicle components, such as a braking subsystem, a suspension system, a steering subsystem, and others.

The vehicle 10 may be an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various additional locations about the vehicle 10 may be used to provide power to corresponding systems and subsystems.

The battery system 22 may be electrically connected to the motors 20 and 21 and/or other components, such as vehicle electronics. The battery system 22 may be configured as a rechargeable energy storage system (RESS) and includes multiple power cells partitioned into portions. A battery system controller 24 (alternately referred to as the controller 24) is included within the battery system 22 and controls the charging and discharging functions of the battery system 22. In alternative configurations, the controller 24 can be a general vehicle controller remote from the battery system 22 and is configured to control multiple systems and/or subsystems. The general vehicle controller can be located at any position within the vehicle 10. In yet further alternatives, the controller 24 can be a distributed control system including multiple coordinating controllers throughout the vehicle 10 encompassing controllers within the battery system 22 and controllers remote from the battery system 22.

In any example, the controller 24 includes a memory 25 storing an energy meta data file 27. The energy meta data file 27 stores meta data about energy stored within the battery system 22. The meta data includes, but may not be limited to, data identifying a source and type of the energy stored within the battery system 22. In some examples, additional supplemental data is stored along with the source and type of the energy.

In one embodiment the battery system 22 connects to an exterior power source 32, such as a home source, a power grid, a charging station, etc. through a charger 30. Once connected the controller 24 can cause the battery system 22 to either charge (take power into the battery system 22) or discharge (transfer power from the battery system 22) through the charger 30. When the charger 30 is connected to an exterior power source 32, a communication is established between the controller 24 and a corresponding controller on the exterior power source 32. The communication can be via any form of data connection, including wired or wireless, and using any communication protocol.

When the exterior power source 32 includes its own energy meta data file 27, the controller 22 exchanges meta data with the exterior power source 32 and the controller 22 updates the meta data file 27 on the vehicle 10 with information provided from the exterior power source 32. When the exterior power source 32 lacks an energy meta data file 27, the corresponding controller of the exterior power source 32 can be polled by the controller 24 for information regarding the source and type of energy generated, and any other pertinent information. When the exterior power source 32 lacks a controller and/or is unable to communicate information regarding the source and type of energy, the controller 24 infers a source and/or type of energy for each unit based on the context in which the unit is received. In some examples, the controller 24 may determine the probable type and source of energy based on weather, season, location, charge station ID, time of day, a phone tracking app, and/or any similar systems. In yet another example, the probable type and source of energy can be determined by the vehicle 10 using data identifying public charging stations and private grid connections, with the data being either stored locally at the vehicle 10 or remotely within a cloud storage system.

By way of example, if the vehicle 10 is typically at a place of employment between 10:00 AM and 6:00 PM, the controller 24 can infer that energy received between 10:00 AM and 6:00 PM is received from a power source 32 at the place of employment. In alternative examples, where the contextual information is insufficient to derive either the source or type of energy, the controller 24 can identify such energy as unknown provenance.

Utilization of the energy meta data file 27 allows for classification of energy sources by tracking energy generation methods (e.g., solar, hydro, wind, coal, nuclear, etc.) and tracking energy sources (public charging stations, local power grid connection, employer provided charging, etc.) of each unit of energy received by the vehicle 10. Tracking energy via the meta data files allows the controller 24 to categorize each unit of energy and prioritize distribution of energy from certain sources and/or of certain types. In some examples, the energy meta data file can include additional information beyond the type and source of the energy. This information is referred to as supplemental information and can include, but is not limited to, time of day, weather, season, location, charge station ID, customer configuration, per unit pricing, the entity paying for the energy etc. that may be correlated with a particular unit of power. In some cases, where energy meta data files are stored to a central storage, the data across multiple energy meta data files can be aggregated and the flow of energy through a distribution system (e.g., energy usage within a fleet of electric vehicles) can be tracked.

Implementation of the energy meta data file 27 allows for the prioritization of energy distribution based on the type or source of energy (e.g., how renewable, or green, a given energy source is, how expensive a given energy source is, who paid for a given unit of energy, etc.)

Example utilizations can include, but are not limited to:

Residential solar energy used to charge a vehicle RESS or residential standby RESS for later use can be prioritized to offset non-renewable energy being supplied by a connected power grid.

Green energy stored within a stationary storage RESS can be used to charge a vehicle RESS for usage in propulsion or as overflow storage of excess green energy that can be later used for a variety of purposes.

Excess green energy at a generation source can be stored within a vehicle battery system 22 for use in the event that a non-green energy production is necessary to meet demand or with changes in the time of day, weather or season.

In some examples, the stored energy distribution can be used selectively in order to maximize available tax credits, or other financial incentives, reliant on using or prioritizing green energy.

Figure 2:
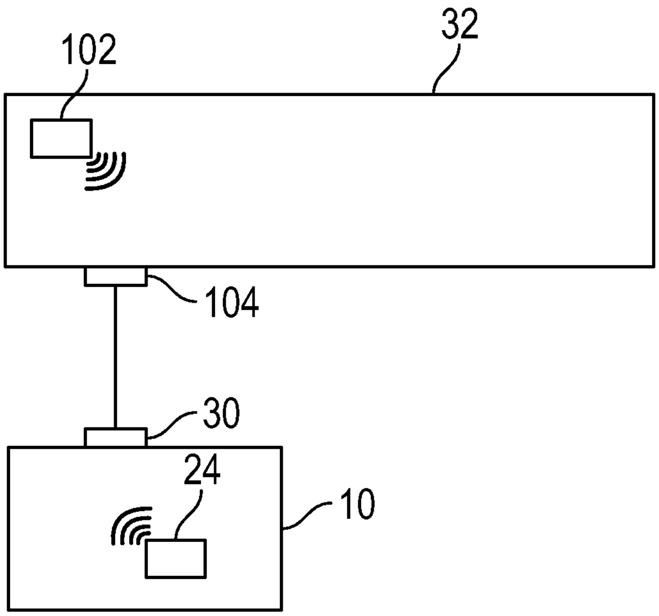
FIG. 2 is a block diagram of a vehicle connected to a charging station.

With continued reference to FIG. 1, FIG. 2 schematically illustrates the vehicle 10 of FIG. 1 connected through the charge port 30 on the vehicle to a charger 104 on an exterior energy source 32. Both the charge port 30 and the charger 104 are able to transfer power to and from their corresponding systems (the vehicle 10 and the exterior energy source 32). Also included on the exterior energy source 32 is a controller 102. The controller 102 includes a similar energy meta data file tracking system as that contained on the vehicle controller 24, and both controllers 102 and 24 are in wireless communication with each other. In alternative examples, the controllers 102, 104 can be in direct or indirect wired communication to each other or are configured to communicate via any available means.

During a basic implementation of the energy meta data file 27 systems, when the vehicle operator initially connects the vehicle charge port 30 to the charger 104, the controller 24 in the vehicle 10 initiates communication with the controller 102 in the exterior energy source 32. When energy is exchanged from one of the vehicle 10 or the exterior energy source 32 to the other of the vehicle 10 or the exterior energy source 32, the controllers 24, 102 communicate the type of energy (solar, wind, fossil fuel, nuclear, etc.) of each unit transferred, as well as any available supplemental information (e.g. price, time of day when the energy originated, etc.). The energy meta data files 27 within each of the controllers 24, 102 are updated and each of the vehicle 10 and the exterior energy source 32 monitors and tracks the type and source of each unit of energy contained in its energy storage.

In some examples, such as a house or a power grid, the exterior energy source 32 may provide varying types of energy depending on the time of day. By way of example, connecting to a house including a solar panel may provide solar energy during daytime, but energy from a local grid operating on coal during the evening/nighttime. In such examples, the source may either inform the receiving system directly or the type may be inferred by supplemental information (e.g., time of day).

Figure 3:
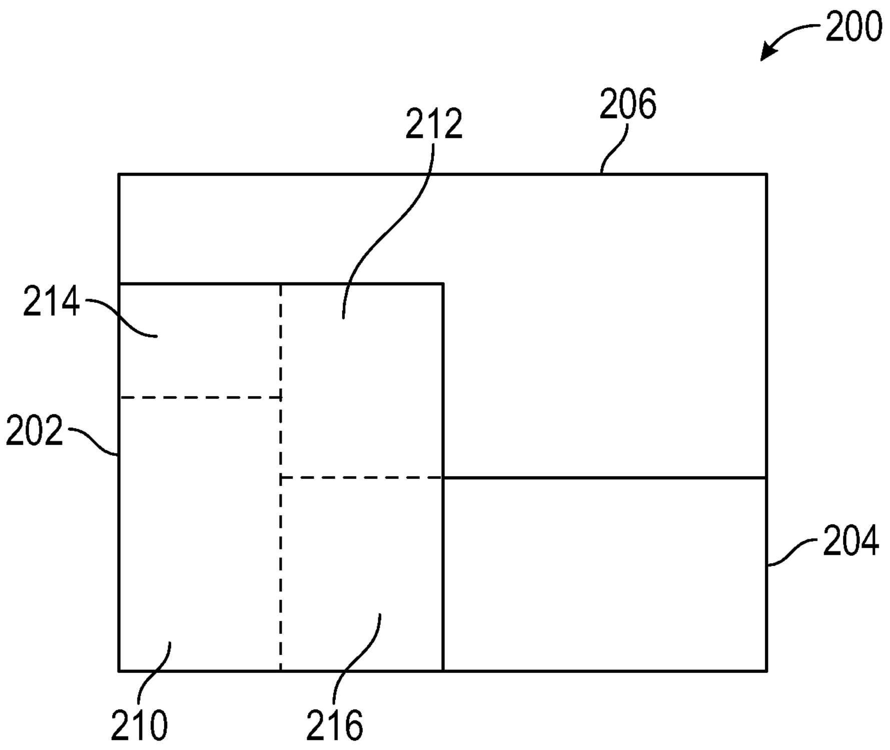
FIG. 3 is a visual representation of stored energy by type of energy.

With continued reference to FIGS. 1 and 2, FIG. 3 is a visual representation of a "type" classification of the energy stored within a battery system 22 on the vehicle 10, as the energy is tracked via the energy meta data file 27. The full shape amount represents the total amount of energy 200. In one example, each unit of energy within the shape is divided among three sections, green energy 202, non-renewable energy 204, and energy of unknown provenance 206, with the space inside each section corresponding to the quantity of energy with that classification. The space inside each classification can be further divided into subcategories such as solar energy 210, wind energy 212, hydroelectric energy 214, and unknown green energy 216. Similar subdivisions can exist within the non-renewable energy 204 section including coal, nuclear, natural gas, and any similar energy sources. The type of classifications listed herein are exemplary, and non-limiting, in nature.

The type of classification illustrated in FIG. 3 is a visual representation of a single axis of information, and the "source" classification of each unit of energy can be visualized and subcategorized in a similar manner.

Referring again to FIG. 2, and with continued reference to FIG. 3, When an energy transfer is initiated, one or more of the controllers 24, 102 may communicate a prioritization condition for the energy transfer. The prioritization condition establishes a preferred or required type and classification of energy that should be transferred first. By way of example, the vehicle 10 controller 24 may establish a prioritization condition that all non-renewable energy is transferred from the vehicle 10 at the earliest opportunity in order to maintain all operations of the vehicle 10 on green energy 202. Similarly, the exterior power source 32 may establish a prioritization condition that energy previously drawn from the exterior power source 32 should be transferred first. In yet a further case, where both systems have prioritization conditions, the controllers 24, 102 can merge the prioritization conditions and begin the transfer with energy matching both conditions. Alternatively, when the prioritization conditions contradict each other, the controllers 24, 102 use a balancing protocol to determine which prioritization condition is implemented. In some such cases, each prioritization condition can be given a weight corresponding to its importance, and the prioritization condition with the higher weight can be implemented by the controllers 24, 102.

When energy matching the prioritization condition has been exhausted, the controllers 24, 102 can either end the transfer (in cases where the condition is a requirement) or can switch to a lower prioritized energy type (in cases where the condition is a preference).

With continued reference to FIGS. 1-3, FIG. 4 illustrates a chart 300 demonstrating a flow of energy using a vehicle, such as the vehicle 10 of FIGS. 1 and 2, using the energy meta data file 27 system.

Initially, the vehicle 10 charges (receives energy into the battery system 22) at a solar energy 210 charging station remote from their home in a step 310.

After sufficiently charging, or fully charging, the vehicle 10 completes a planned trip in step 312. In the illustrated example, the planned trip is a trip from the solar charging station to a home.

Once at home, the vehicle 10 connects to a home system in a step 314. Once connected the controller 24 determines if excess energy is available within the battery system 22 in an "is excess green energy available" check 316. This corresponds to a "use excess green energy" 202 prioritization condition.

When there is no excess green energy 202, no energy is transferred from the vehicle 10 due to the prioritization condition, and the vehicle 10 returns to the solar charging station in a step 318.

When there is excess green energy 202 available, the excess green energy 202 is transferred to the home system in a transfer excess green energy 202 to home step 320.

Once the excess energy has been transferred, the vehicle 10 returns to the solar charging station in step 318.

After returning to the solar charging station, the vehicle 10 returns to the initial step 310 and charges from the solar charging station again.

Figure 4:
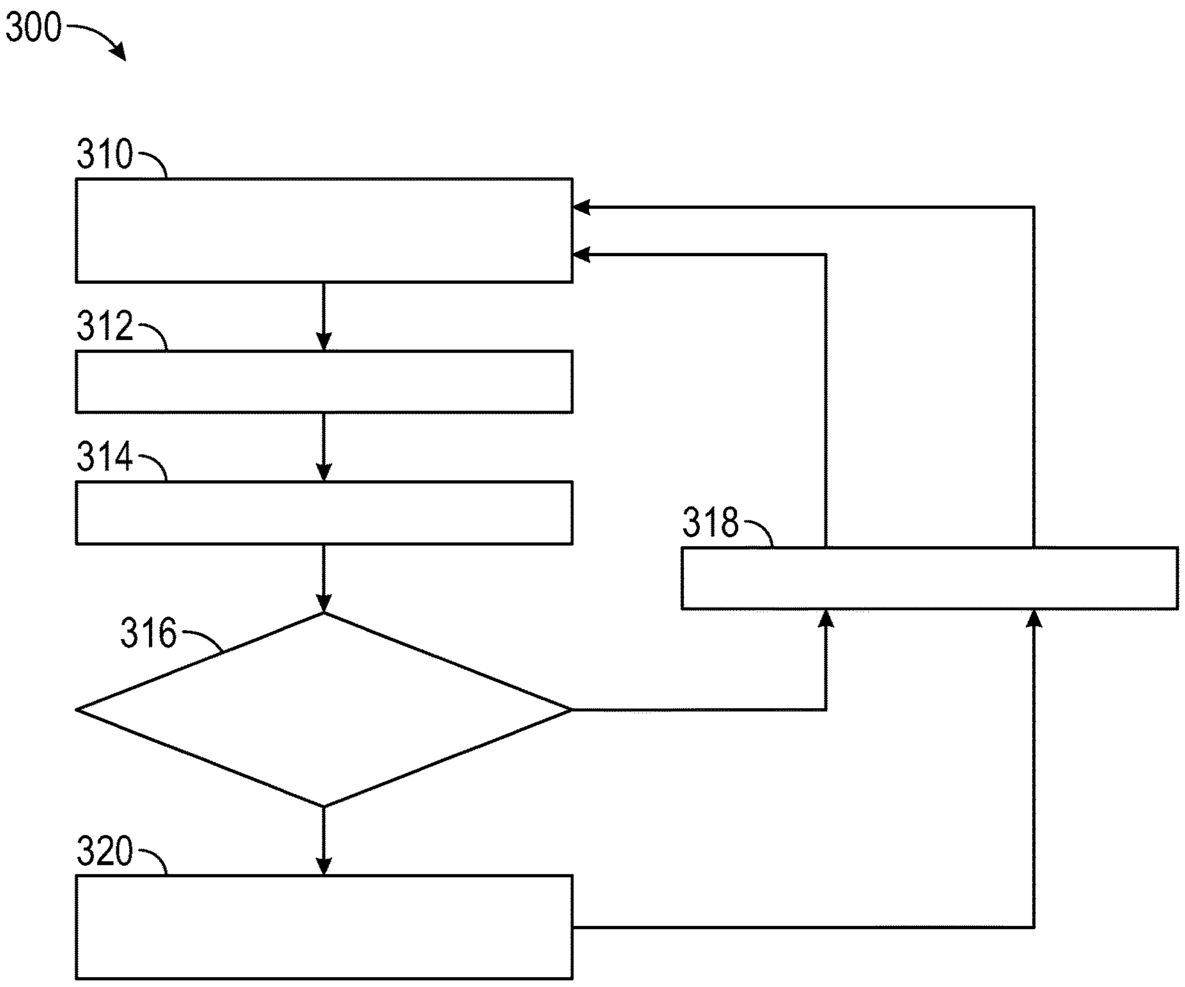
FIG. 4 illustrates a method for prioritizing energy type usage in a single vehicle.
Figure 5:
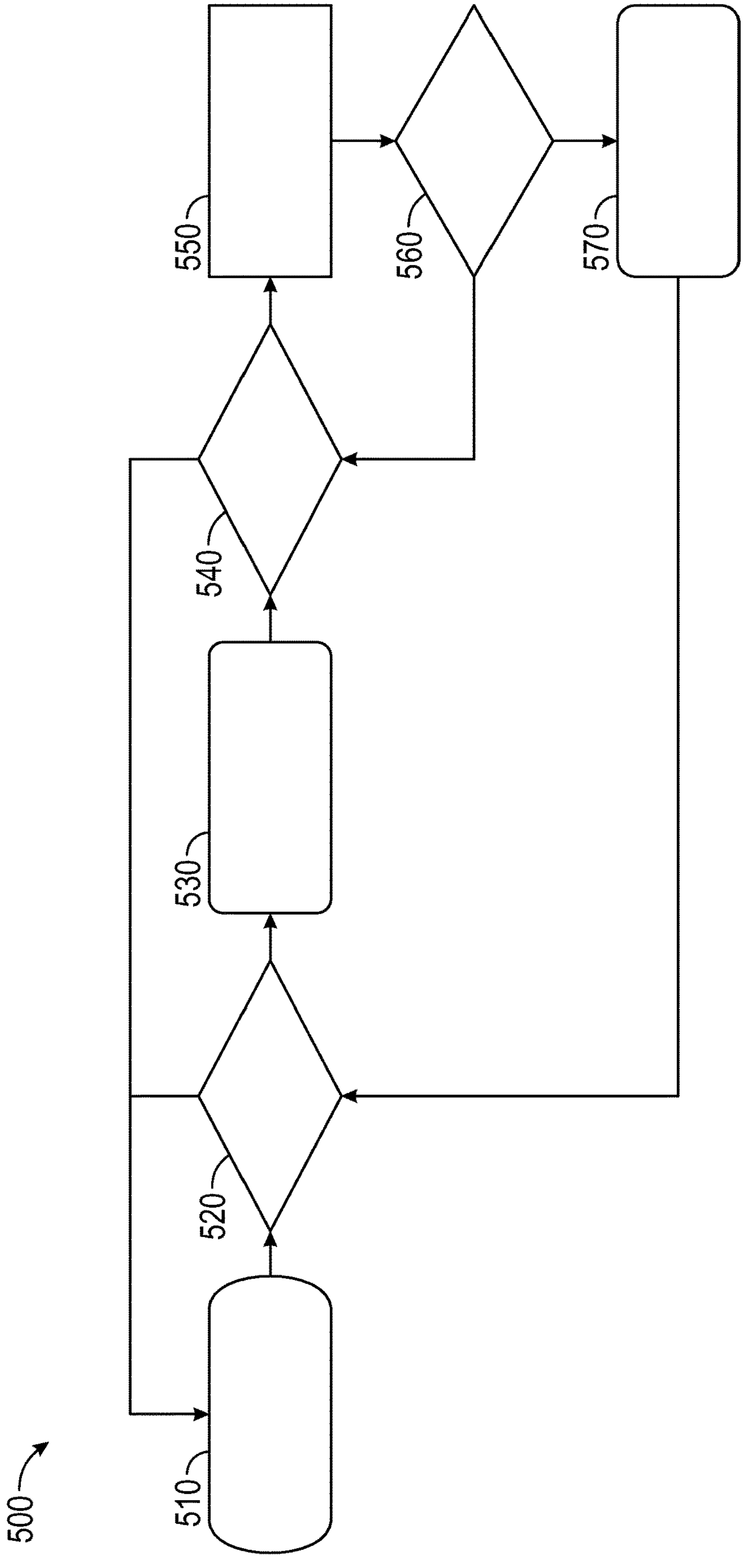
FIG. 5 illustrates an exemplary method for tracking and prioritizing energy type usage throughout an energy distribution system.

While each of the steps and checks of FIG. 4 are listed immediately after each other, it is appreciated that expected delays can occur between operation or performance of each step. By way of example, charging from the solar charging station (step 310) may occur over the course of a workday while the vehicle 10 operator is at work. In this example, the following steps 312, 314, 316, 320 would occur after the vehicle 10 owner got off work, and the return to solar station step 318 would occur the next time the vehicle 10 owner returned to work.

With continued reference to FIGS. 1-3, FIG. 5 illustrates a general method 500 for applying a prioritization condition of using green energy first to a power generation source 32. Initially, the controller 24, 102 receives power from any type or source and categorizes the energy using the energy meta data file 27 in step 510. While receiving energy, the system receiving the energy monitors its own energy needs and determines if there is a surplus of green energy being provided from the various power sources in a check 520. When no surplus exists, the system continues receiving power and monitoring the power received.

When a surplus of green energy exists, the method 500 prioritizes receipt of the green energy and stores the surplus green energy within an energy storage system (e.g., battery system 22) at step 530, and determines whether the surplus green energy is needed at a check 540. If the surplus green energy is not currently needed the method 500 continues receiving and storing the excess energy.

When a need for the excess energy exists, the previously stored excess green energy is transferred from the storage to whatever connected system requires the energy in a step 550. As the energy is used, the method 500 continuously checks to determine if the green energy within the energy storage system has been depleted in a check 560. When the stored green energy has not been depleted, the method 500 returns to check 540 and determines if more energy is still needed. If the green energy is depleted, power from alternate sources is utilized in a step 570, and the method 500 returns to the initial check 520 to determine if surplus green energy exists.

With reference to all FIGS. The energy meta data files 27 can be shared, in some examples, with a central database via the internet, a cloud service, cell phone data connections, or any other data connection and the central database aggregates the energy meta data files 27 from all of the participating systems. The central database can track a flow of the various types and sources of energy through an energy ecosystem, and the data can be utilized to determine charging station locations, energy transfer times/conditions, or any similar information.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. An energy distribution system comprising:

at least a first energy storage system including a controller and at least one energy storage unit configured to store a quantity of energy, the controller including a non-transitory memory storing an energy meta-data file, wherein the energy meta-data file includes an energy type element and an energy source element and wherein the quantity of energy is associated with the energy meta-data file in a per-unit energy association; and wherein the non-transitory memory further stores instructions for causing the controller to implement a method for prioritizing energy distribution, the method comprising:

identifying a first prioritization condition for a pending energy transfer;

transferring energy units matching the first prioritization condition in an energy transfer; and determining a response when the energy transfer is incomplete and energy units matching the first prioritization condition are exhausted.

2. The energy distribution system of claim 1, wherein the energy type element includes at least a first fossil fuel energy category, at least a first green fuel energy category, and an unknown type category.

3. The energy distribution system of claim 2, wherein the at least a first green fuel energy category includes a plurality of green energy categories.

4. The energy distribution system of claim 1, wherein the quantity of energy is associated with the energy meta-data file in a fungible energy association.

5. The energy distribution system of claim 1, wherein determining the response comprises identifying a second prioritization condition and transferring energy units matching the second prioritization condition.

6. The energy distribution system of claim 1, wherein determining the response comprises ending the energy transfer.

7. The energy distribution system of claim 1, wherein the first prioritization condition includes at least one of a type of energy and a source of energy.

8. The energy distribution system of claim 7, wherein the type of energy includes at least one of green energy, wind energy, solar energy, and hydroelectric energy.

9. The energy distribution system of claim 8, wherein the source of energy includes at least one of a power grid, an energy cost, and a charge location.

10. The energy distribution system of claim 1, wherein the controller is configured to manage the energy meta-data file through a remote connection with one of a cloud service and a remote server.

11. The energy distribution system of claim 1, wherein the at least the first energy storage system includes an electric vehicle energy storage system.

12. A method for prioritizing energy flow between energy storage systems comprising:

identifying a primary prioritization condition for a pending energy transfer;

identifying energy units matching the primary prioritization condition within an energy source by reading an energy meta data file corresponding to the energy source;

transferring energy units matching the primary prioritization condition in an energy transfer from the energy source to an energy destination; and determining a response when the energy transfer is incomplete and energy units matching the primary prioritization condition are exhausted.

13. The method of claim 12, wherein determining the response when the energy transfer is incomplete and energy units matching the primary prioritization condition are exhausted comprises ceasing the energy transfer.

14. The method of claim 12, wherein determining the response when the energy transfer is incomplete and energy units matching the primary prioritization condition are exhausted comprises identifying at least one secondary prioritization condition and transferring energy units matching the at least one secondary prioritization condition.

15. The method of claim 14, wherein determining the response comprises identifying a second prioritization condition and transferring energy units matching the second prioritization condition.

16. The method of claim 14, wherein the first prioritization condition includes at least one of a type of energy and a source of energy.

17. The method of claim 12, wherein the energy meta data file includes an energy type element and an energy source element.

18. The method of claim 17, wherein the energy meta data file is a fungible tracking energy meta data file.

19. The method of claim 17, wherein the energy meta data file is a per unit meta data file.

20. The method of claim 12, wherein one of the energy source and the energy destination is a vehicle energy storage system.

* * * * *